United States Patent [19]

Suzuki

[11] Patent Number: 4,741,594
[45] Date of Patent: May 3, 1988

[54] OPTICAL TRANSMISSON LINE AND MULTICONDUCTOR FLAT CABLE INCORPORATING SAME

[75] Inventor: Hirosuke Suzuki, Tokorozawa, Japan

[73] Assignee: Junkosha Co., Ltd., Tokyo, Japan

[21] Appl. No.: 656,990

[22] Filed: Oct. 2, 1984

[30] Foreign Application Priority Data

Oct. 18, 1983 [JP] Japan ................................ 58-194718

[51] Int. Cl.⁴ .............................................. G02B 6/44
[52] U.S. Cl. ................................................ 350/96.23
[58] Field of Search ................ 350/96.23, 96.29, 96.30

[56] References Cited

U.S. PATENT DOCUMENTS 4,468,089  8/1984  Brorein .............................. 350/96.23

Primary Examiner—William L. Sikes
Assistant Examiner—Robert E. Wise
Attorney, Agent, or Firm—Mortenson & Uebler

[57] ABSTRACT

An optical transmission line is provided comprising an elongate light guide surrounded by a layer of a porous plastic, preferably expanded, porous polytetrafluoroethylene, and having at least one reinforcing strand, such as a wire, positioned outside of the porous plastic layer, this entire assembly encased in a resin sheath having a rectangular cross-section such that the light guide is positioned at the center of the cross-section of the resin sheath along the length of this transmission line. Multiconductor flat cable is provided by bonding a multiplicity of these optical transmission lines together. The transmission line is useful for transmitting optical energy signals.

9 Claims, 1 Drawing Sheet

OPTICAL TRANSMISSON LINE AND MULTICONDUCTOR FLAT CABLE INCORPORATING SAME

BACKGROUND OF THE INVENTION

This invention relates to an optical transmission line whose properties remain unchanged under the application of external forces, especially compressive forces, and a flat cable comprising a plurality of such transmission lines.

It is common practice to lay circular communication cables along floor surfaces for indoor telephone wiring, or for wiring between electronic machines. Recently, however, with developments in office automation systems and information processing machines, wiring has been reviewed with greater interest, and it has been proposed to lay flat cables beneath carpet tiles, for reasons of visual appearance, ease of laying, and safety. For this purpose, an extremely thin, flat cable, a so-called undercarpet cable, has been developed. Further, in the communication systems for office automation, especially for the communications between electronic computers and their terminals, optical transmission lines have been devised and employed to accomodate increases in channel capacity. Utilization of optical transmission lines in undercarpet cables is also desired.

However, as is well known, an optical transmission line is vulnerable to external forces, so that when such a line is used in a situation where it is likely to be subjected to large external forces, such as when it is used in an undercarpet cable, specific protection and reinforcement of the line is required. For this purpose, a protective layer and a reinforcing line or lines are usually provided such as those disclosed in U.S. Pat. Nos. 4,185,887; 4,00,932 and 4,231,635. An optical transmission line 1 illustrated in FIG. 1 has been provided. The optical transmission line 1 has a structure in which a buffer layer 3 of silicone resin is provided around an optical light guide or fiber 2 of quartz, glass or certain plastics, and a plurality of reinforcing strands 4 are placed lengthwise along and surrounding the buffer layer 3, the reinforcing strands 4 being held in position by tape 5 wound therearound, and a sheath 6 made of PVC or a similar material is provided covering all the component parts. The optical transmission line 1 can be used singly, but it is also possible to connect a plurality of these lines laterally to form a flat cable 7, as shown schematically in FIG. 2.

However, because this known optical transmission line has a circular cross-section, it tends to twist or distort when it is laid along a floor surface. Such a strip also has insufficient resistance to compressive forces, and deformation of the sheath 6 is bound to affect the optical transmission line 2, so that when it is used where large external forces are applied, such as when it is laid below carpet tiles, the transmission characteristics of the line can be greatly impaired. The connection of these lines to terminal strips, connectors, etc., is difficult and when a plurality of these lines are combined and used in a flat cable, as shown in FIG. 2, unsatisfactory resistance to compressive forces results.

The present invention has been developed in view of defects in prior art transmission lines. An object of the invention is the provision of an optical transmission line with improved resistance to external forces, especially compressive forces, which can be used for an undercarpet cable or a flat cable generally.

SUMMARY OF THE INVENTION

An optical signal transmission line is provided comprising an elongate light guide having affixed thereon along its length an external buffer layer of a porous plastic material, and having at least one elongate reinforcing strand positioned externally with respect to the buffer layer in substantially parallel relationship to the light guide, this assembly of light guide, buffer layer and reinforcing strand encased in a resin sheath having a rectangular cross-section, the light guide being positioned at the geometric center of the sheath along the length of the transmission line. Two reinforcing strands symmetrically positioned within the sheath with respect to the light guide along the length of the transmission line are preferred, and the light guide and reinforcing strand or strands are preferably arranged in a plane parallel to two opposite sides of the rectangular resin sheath. The reinforcing strand or strands can be metal wire. The buffer layer is preferably a layer of expanded, porous polytetrafluoroethylene and the resin sheath is preferably a sheath of a fluoroplastic resin. The light guide maintains a plane of polarization, and a positional relationship between this plane of polarization and the reinforcing strand or strands is fixed along the length of the transmission line.

A flat cable is provided comprising a plurality of the transmission lines of the invention bonded together along their length.

A flat cable is also provided comprising at least one optical transmission line of the invention bonded along its length to at least one electrical signal transmission line comprising at least one electrical signal conductor having a porous plastic cover and having at least one elongate reinforcing strand positioned externally with respect to the cover in substantially parallel relationship to the signal conductor, this assembly of signal conductor with cover and reinforcing strand encased in a resin sheath having a rectangular cross-section, the signal conductor being positioned at the geometric center of the resin sheath along the length of the electrical signal transmission line.

Figure 1:
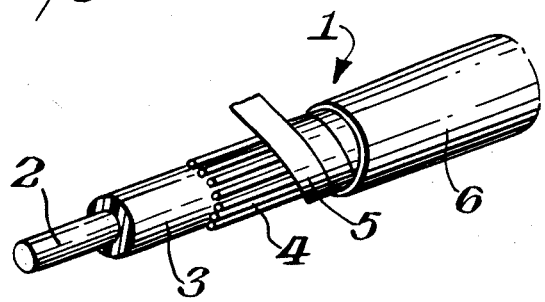
FIG. 1 is a perspective view of an end of a conventional optical transmission line.

DETAILED DESCRIPTION OF THE INVENTION AND PREFERRED EMBODIMENTS WITH REFERENCE TO THE DRAWINGS

The present invention provides an optical transmission line comprising at least one optical light guide surrounded by a buffer layer, at least one reinforcing strand provided outside the buffer layer, and a resin sheath having a rectangular cross-section which encases the light guide and reinforcing line. It is preferred that at least part of the buffer layer be made of expanded, porous polytetrafluoroethylene (PTFE) because the use of this resin stabilizes the buffering performance of this layer over a wide temperature range and minimizes the lengthwise elongation of the layer due to changes in temperature.

It is preferred to use a fluororesin for the rectangular resin sheath. The use of such a resin improves the heat and weather resistance of the sheath and its adhesion to the expanded PTFE buffer layer around the optical transmission line. This facilitates the adaptation of terminal connectors and improves the working efficiency of connector joints. Further, a fluororesin, when compared with PVC and other resins, has excellent and desirable mechanical properties so that a thin coating thereof is possible, and this is preferred for undercarpet cables.

In the optical transmission line according to this invention, as described above, the light guide is surrounded by a buffer layer and embedded in a resin sheath having rectangular cross-section, so that when a compressive force is applied thereto the pressure which reaches the light guide is greatly reduced. The rectangular contour of the sheath makes it difficult for the transmission line to kink when it is laid along a floor surface enabling substantial preservation of the transmission characteristics of the optical transmission line along its entire length.

The optical transmission line of this invention has good dimensional stability because it is rectangular in cross-section, and it is easy to assemble the transmission lines into a flat cable, a "slotted" flat cable defined below, or other forms of cable. In addition, when the transmission lines are formed into a flat cable, because each line has an elongated shape with a rectangular cross-section of the same dimensions, the sides thereof perpendicular to the connected surfaces of the transmission lines are connected continuously with each other to form a flat plane. Stresses are received by this plane and are prevented from concentrating on the buffer layers or optical fiber. Accordingly, the mechanical strength of the cable with respect to external compressive forces is greatly improved, in comparison with a flat cable formed by joining together conventional circular transmission lines and, thus, the transmission characteristics of the lines of this invention remain substantially unaffected, even when they are used as an undercarpet cable.

It is possible to form a flat cable or a "slotted" flat cable from a suitable combination of the optical transmission lines of this invention with electrical signal transmission lines, each provided with at least one electrical signal conductor having a resin coating therearound, at least one metal reinforcing wire arranged outside the coating, and a rectangular resin sheath covering the electrical signal conductor and the metal wire assembly. This and other types of composite cables can easily be made by selecting appropriate numbers of optical signal and electrical signal transmission lines, and arranging them according to the desired purpose. For the porous resin enclosing the electrical signal conductor, it is preferable to use expanded, porous PTFE which has a low dielectric constant tan δ, and which is not substantially affected by changes in temperature and frequency. The electrical signal transmission line may be used as a power supply line.

The present invention is best described in more detail by way of the embodiments thereof illustrated in FIGS. 3 through 8, but it is to be understood that the invention is not limited to these embodiments. Various changes and modifications can be made without departing from the technical scope of the invention.

Figure 2:
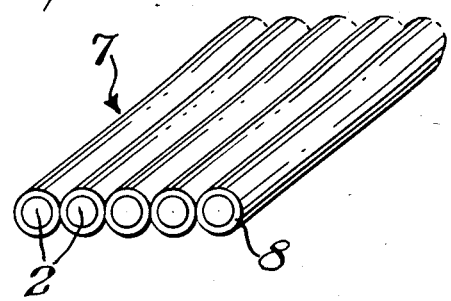
FIG. 2 is a perspective view of an end of a conventional cable using the transmission line of FIG. 1.

FIGS. 1 and 2 have been described above.

Figure 3:
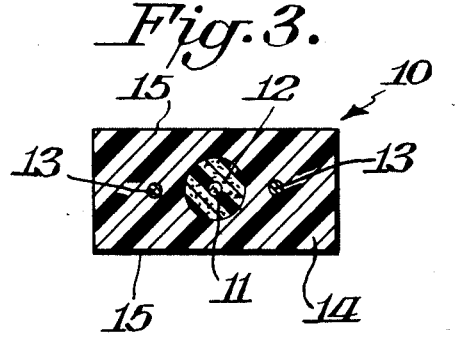
FIG. 3 is a cross-sectional view of an optical transmission line according to one embodiment of this invention.

FIG. 3 is an end view of an optical transmission line 10 according to the present invention. The optical transmission line 10 is provided with a buffer layer 12 made of expanded, porous PTFE, or the like, surrounding optical fiber or light guide 11. A pair of reinforcing metal lines 13 are arranged at symmetrical positions at either side of the light guide 11, and all these elements are integrally covered by a resin sheath 14 which has rectangular cross section. In this case, the two metal lines 13 and the optical light guide 11 are arranged on the same plane, and extend substantially parallel to the two opposite sides 15 of the rectangular resin sheath 14.

The resin sheath having rectangular cross-section is preferably made of a fluororesin selected from the class consisting of polytetrafluoroethylene resin (PTFE), tetrafluoroethylene/perfluoroalkyl vinyl ether copolymer resin (PFA), tetrafluoroethylene/hexafluoropropylene copolymer resin (FEP), EPE resin, tetrafluoroethylene/ethylene copolymer resin (ETFE), trifluoroethylene resin (PCTFE), and vinylidene fluoride resin (PVDF).

It is known that optical fibers are fibers of glass, quartz or synthetic plastic materials having a very small diameter and comprising a tubular core and cladding or sheath, the index of refraction of the sheath being smaller than that of the core. In the embodiment of FIG. 3, a quartz-based optical fiber with a core diameter of 50 $\mu$m, a cladding diameter of 125 $\mu$m, a wavelength of 0.85 $\mu$m and an attenuation of 7 dB/km was used as the light guide 11, and sintered, expanded porous PTFE tape having a thickness of 0.05 mm and a width of 10 mm was helically wound around the optical fiber 11 to form buffer layer 12 having an outer diameter of 0.45 mm. Two silver-plated soft copper wires 0.16 mm in diameter were used as the reinforcing strands 13, the wires being arranged 0.5 mm apart from each other at symmetrical positions with respect to the central optical fiber 11. The covered fiber and the wires were embedded in a rectangular cross-section resin sheath 14 having a width of 1.3 mm and a thickness of 0.7 mm, the sheath 14 being made of FEP resin by extrusion molding. When a load of 2 Kgf/cm$^2$ was applied to this optical transmission line, it exhibited no change in transmission characteristics, and no dimensional changes, along its entire length (Example 1).

In this embodiment, the resin sheath 14 covering the optical fiber assembly and reinforcing strands 13 has a rectangular cross-section, so that it is easier to assemble transmission lines of this invention into a flat cable or a "slotted" flat cable than when conventional circular optical transmission lines are used, because the lines of this invention provide a greater area for connection.

Figure 4:
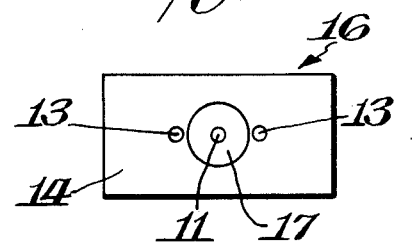
FIG. 4 is an end elevational view of an alternate embodiment of optical transmission line of this invention.

FIG. 4 is an end view of an optical transmission line according to another embodiment of this invention. In the optical transmission line 16 according to this embodiment, the optical fiber 11 is coated with a silicone resin so that it has an outer diameter of 0.45 mm, and unsintered, expanded, porous PTFE is wound therearound to form a relatively thick buffer layer 17 measuring 0.75 mm in outer diameter. A pair of reinforcing strands 13 is positioned in close proximity to the buffer layer 17. Resin sheath 14 has a rectangular cross-section. This sheath is preferably made of a fluororesin in the same way as in the embodiment of FIG. 3. The optical transmission line, reinforcing strands and resin sheath of this embodiment were made using the same materials and the same dimensions as employed in Example 1, and the line thus produced was subjected to the same test as that of the previous example. No deterioration of transmission characteristics was observed, and a 15% reduction in lateral dimension could be achieved, compared with the transmission line of Example 1. The expanded, porous PTFE tape used in this embodiment was prepared according to the following. A mixture of finely-powdered PTFE and a liquid lubricant was paste-extruded, and then the extrudate was subjected to known steps of rolling and lubricant removal to form unsintered PTFE tape. This tape was stretched to three times its original length in air at 300° C. for 10 seconds to obtain a 0.05 mm thick sintered, expanded, porous PTFE tape. The tape was slit to a width of 10 mm and wound spirally around the optical fiber to form the buffer layer. A similar buffer layer can be provided in various other ways. For example, it can be formed by using a silicone resin, an elastic rubber such as urethane rubber, or a spongy material such as foamed polyurethane, or a combination thereof. To integrate the buffer layer to the resin sheath, heat fusion or the use of an adhesive is preferred.

It is possible to use as the reinforcing strands of this invention polyamide fibers, glass fibers, carbon fibers, expanded porous PTFE filaments, single or stranded metal wires, and the like.

In the embodiments shown in FIGS. 3 and 4, a single optical fiber is placed within the buffer layer, but it is, of course, possible to use two or more optical fibers in a twisted form, or placed at some distance from each other.

FIGS. 5 to 8 show some typical forms of flat cable using the optical transmission lines according to this invention.

Figure 5:
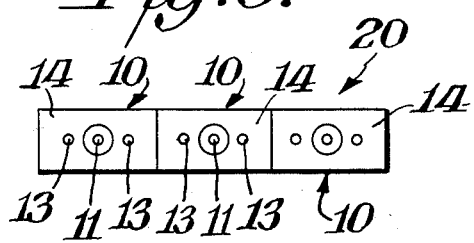
FIGS. 5 and 6 are end elevational views of flat cables made using the optical transmission lines according to the present invention.

FIG. 5 shows a flat cable 20 formed from an integral assembly of a plurality of optical transmission lines according to the embodiment of this invention shown in FIG. 3, with the lines arranged next to each other. In this flat cable 20, the rectangular resin sheaths 14 are positioned side-by-side so that the pairs of symmetrical reinforcing strands in each of the sheaths are aligned horizontally, Thus, in flat cable 20, the transmission lines 10 are arranged so that the two opposite sides of each line which are perpendicular to the plane through the pair of reinforcing lines 13 are the sides which are connected. In this case, the optical transmission lines 10 are heat-bonded to each other.

When a load of 2 Kgf/cm² was applied to this flat cable 20, in the same manner as in Example 1, the cable exhibited no changes in transmission characteristics, and the connection of each member to a connector could be accomplished easily by soldering them in a line, with the reinforcing strands being soldered first. The reinforcing strands can be used as guide pins for the joining of connectors.

If a type of light guide in which the plane of polarization is retained is used as the optical fiber, and the transmission line is so constructed that the positional relationship between the pair of reinforcing strands and the plane of polarization do not change in the lengthwise direction, it is easy to align the planes of polarization when the transmission line is connected to other lines.

Figure 6:
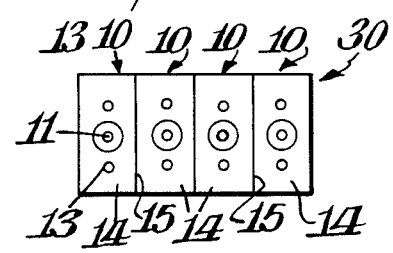

FIG. 6 shows a flat cable 30 comprising an integral assembly of optical transmission lines 10 of the embodiment of FIG. 3, in which the lines 10 are connected together at the sides 15 which are at 90° to the sides connected in the embodiment of FIG. 5, that is, the two opposite sides of each rectangular resin sheath which are parallel to a plane through a pair of reinforcing strands 13. In this case, the thickness of the cable is increased, but, because the pairs of reinforcing strands 13 are positioned above and below the corresponding optical fibers 11, and the rectangular resin sheath 14 has an increased section modulus, the resistance of the cable to compressive forces is further increased.

Figure 7:
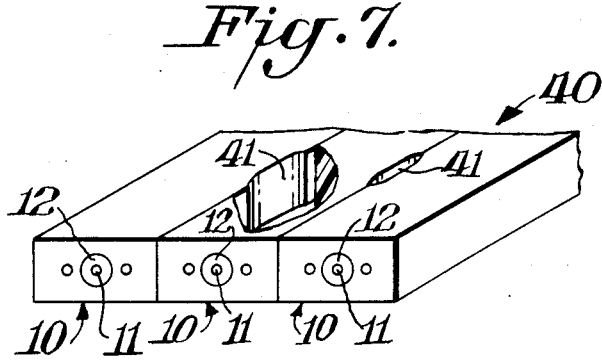
FIG. 7 is a perspective view of an end of a "slotted" flat cable, defined hereinbelow, made using optical transmission lines according to the embodiment shown in FIG. 3.

FIG. 7 shows a modification of the flat cable 20 of the embodiment shown in FIG. 5. In this modification, a so-called "slotted" flat cable 40 is formed from a plurality of optical transmission lines 10 arranged next to each other in such a manner that gaps or slots or unconnected portions 41 are provided intermittently along the length of the cable. This "slotted" flat cable 40 has the advantage that when the cable is distorted or bent, little tension or stress such as compression stress is imparted to the optical fibers, keeping them free from changes in transmission characteristics. With this "slotted" flat cable, the optical transmission lines 10 can be easily separated from each other by cutting between the unconnected portions 41, so that there is no need to tear the cable, and hence its working efficiency is improved.

Although not shown, similar intermittent gaps or unconnected portions can be provided in the flat cable of FIG. 6, or a flat cable or a "slotted" flat cable such as those shown in FIGS. 5 to 7 can be made in a similar way by using the optical transmission line 16 of the embodiment of FIG. 4.

Figure 8:
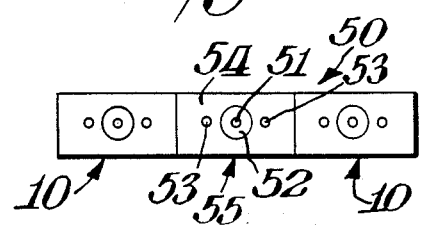
FIG. 8 is an end elevational view of a composite flat cable made by integrally combining optical transmission lines shown in FIG. 3 with an electrical signal transmission line.

FIG. 8 shows a different mode of application of the optical transmission lines 10 according to the embodiment of FIG. 3, in which the lines 10 are used in combination with electrical signal transmission lines 55 to form a composite flat cable 50.

Each electrical signal transmission line 55 has a structure in which a porous resin 52 such as expanded, porous PTFE is provided around an electrical signal conductor 51, and a pair of metal lines 53 are disposed symmetrically on either side of the electric signal conductor 51, the elements being covered by a resin sheath 54 having a rectangular cross-section. The resin sheath 54 is preferably molded from a fluororesin in the same way as in the previous embodiments, because of its good electrical and thermal properties.

In accordance with this embodiment, silver-plated copper wire 0.16 mm in diameter was used for both the electrical signal conductor 51 and metal lines 53, and a tape of a partially sintered, expanded, porous PTFE having a specific gravity of 0.68 was wound around the electric signal conductor 51 and was then fully sintered at 340° C. The 0.4 mm diameter sintered tape was covered with an extrusion-molded FEP resin sheath having a rectangular cross-section with a width of 13 mm and a thickness of 0.7 mm. The characteristic impedance of the electrical signal transmission line was 95Ω and the propagation delay time was 4.1 nsec/m. When a pulse with a rise time of 2.5 nsec (10–90% value) was transmitted through a 5 m long electrical signal transmission line of this construction, the rise time was reduced to 7 nsec.

When the electrical signal transmission line of this invention was compared with a conventional electrical signal transmission line made entirely of PFA resin and which had a characteristic impedance of 95Ω, an approximately 10% reduction could be achieved in the dimension between the signal conductor and the outer conductor, and a 13% improvement in propagation delay time and a 30% improvement in pulse rounding were also provided. It was also found possible to improve the electrical characteristics of the electrical signal transmission line by arranging the metal lines adjacent to the porous resin used as a dielectric, as shown in FIG. 4.

The electric signal transmission line 55 of this embodiment had a rectangular resin sheath 54 of the same material and dimensions as those of the optical transmission lines 10 of the embodiment of FIG. 3, so that the line 55 can be easily connected to the line 10 and, when they are integrated into a flat cable, the cable surface is smooth and flat and has a good visual appearance. In addition, because any desired number of optical transmission lines 10 and electrical signal transmission lines 55 can be connected together in any desired arrangement, a composite flat cable suitable for its intended use can be easily produced.

When forming a composite flat cable by combining electrical signal transmission lines 55 with the optical signal transmission lines 10 (FIG. 3) or 16 (FIG. 4), they can be connected in the manner shown in FIG. 6. It is, of course, possible to connect them in such a way that gaps are formed intermittently along the length of the cable to make a "slotted" flat cable.

As described above, the optical transmission line according to this invention has a structure in which a buffer layer is provided around an optical fiber, at least one reinforcing strand is arranged outside the buffer layer, and these members are encased in a resin sheath which has a rectangular cross-section, so that the transmission line has improved compressive force resistance and terminal workability. Any desired number of lines can be easily assembled into a flat cable or a "slotted" flat cable, and the number of the optical transmission lines used can be selected from a wider range than that possible with conventional extrusion-molded flat cables. Because a cable is made by integrally connecting completed optical transmission lines, the cable produced has reduced strains in the sheathing, compared to a flat cable made by extrusion molding or by tape lamination. No substantial difference in transmission characteristics is observed between the optical transmission lines. It is possible to easily obtain a composite flat cable by an appropriate combination with electrical signal transmission lines. In addition, the present invention provides marked improvements in dimensional stability and workability, and offers great benefits in the production of optical transmission lines and in the practical use thereof.

While the invention is described above by way of typical embodiments thereof, it will be readily understood that various changes and modifications to the described embodiments, such as the use of plastic fibers instead of optical fibers, the use of PVC and other plastics as the resin of the rectangular sheath, the addition of a pigment, the placing of identification marks, and similar modifications can be made which are all within the scope of the invention.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An optical signal transmission line comprising an elongate light guide surrounded along its length by a buffer layer of a porous plastic material, and having at least one elongate reinforcing strand positioned externally with respect to said buffer layer in substantially parallel relationship to said light guide, this assembly of light guide, buffer layer and reinforcing strand encased in a resin sheath having a rectangular cross-section, said light guide being positioned at the geometric center of said sheath along the length of said transmission line.

2. The transmission line of claim 1 having two reinforcing strands symetrically positioned within said sheath with respect to said light guide along the length of said transmission line.

3. The transmission line of claims 1 or 2 wherein said light guide and reinforcing strand or strands are arranged in a plane parallel to two opposite sides of said rectangular resin sheath.

4. The transmission line of claim 1 wherein said reinforcing strand is a metal wire.

5. The transmission line of claim 1 wherein said buffer layer is a layer of expanded, porous polytetrafluoroethylene.

6. The transmission line of claim 1 wherein said resin sheath is a sheath of a fluoroplastic resin.

7. The transmission line of claim 1, 2, 4, 5 or 6 wherein said light guide maintains a plane of polarization, and a positional relationship between said plane of polarization and said reinforcing strand or strands is fixed along the length of said transmission line.

8. A flat cable comprising a plurality of the transmission lines of claim 1 bonded together along the length of said transmission lines.

9. A flat cable comprising at least one transmission line of claim 1 bonded along its length to at least one electrical signal transmission line comprising at least one electrical signal conductor having a porous plastic cover and having at least one elongate reinforcing strand positioned externally with respect to said cover in substantially parallel relationship to said signal conductor, this assembly of signal conductor with cover and reinforcing strand encased in a resin sheath having a rectangular cross-section, said signal conductor being positioned at the geometric center of said resin sheath along the length of said electrical signal transmission line.

* * * * *